United States Patent
Wang (10) Patent No.: US 9,247,465 B2
(45) Date of Patent: Jan. 26, 2016

(54) METHOD AND APPARATUS FOR RE-ESTABLISHING RADIO LINK

(71) Applicant: ZTE Corporation, Shenzhen (CN)

(72) Inventor: Dafei Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/394,285

(22) PCT Filed: Apr. 1, 2013

(86) PCT No.: PCT/CN2013/073583
§ 371 (c)(1),
(2) Date: Oct. 14, 2014

(87) PCT Pub. No.: WO2013/152685
PCT Pub. Date: Oct. 17, 2013

(65) Prior Publication Data
US 2015/0119041 A1 Apr. 30, 2015

(30) Foreign Application Priority Data

Apr. 13, 2012 (CN) .......................... 2012 1 0107984

(51) Int. Cl.
*H04W 36/00* (2009.01)
*H04W 76/02* (2009.01)

(52) U.S. Cl.
CPC ...... *H04W 36/0055* (2013.01); *H04W 36/0038* (2013.01); *H04W 76/02* (2013.01)

(58) Field of Classification Search
CPC .................... H04W 36/0055; H04W 36/0038; H04W 76/046; H04W 40/36
See application file for complete search history.

(56) References Cited

U.S. PATENT DOCUMENTS

| 8,706,119 B2 * | 4/2014 | Jeon | H04W 36/0083 455/436 |
| 2010/0002883 A1 * | 1/2010 | Sammour | H04L 63/1416 380/272 |

FOREIGN PATENT DOCUMENTS

| CN | 101959262 A | 1/2011 |
| CN | 101959263 A | 1/2011 |
| CN | 102223632 A | 10/2011 |
| CN | 102300278 A | 12/2011 |
| CN | 102625471 A | 8/2012 |
| CN | 102821384 A | 12/2012 |

OTHER PUBLICATIONS

International Search Report for corresponding application PCT/CN2013/073583 filed Apr. 1, 2013; Mail date Jul. 4, 2013.

* cited by examiner

*Primary Examiner* — Curtis Odom
(74) *Attorney, Agent, or Firm* — Cantor Colburn LLP (57) ABSTRACT

The disclosure provides a method and an apparatus for re-establishing a radio link. The method comprises: a destination base station receiving a re-establishment request message sent by a User Equipment (UE), a cell identifier and an identifier of the UE are carried in the re-establishment request message, and attribute information used for indicating UE handover success or handover failure is carried in the cell identifier and the identifier of the UE (S102); and the destination base station determining, according to the attribute information, a security algorithm applied to radio link re-establishment between the destination base station and the UE, and establishing a radio link using the security algorithm (S104). The disclosure solves the problem in the related art that the radio link re-establishment fails as a security algorithm fallback process fails, thereby improving the success rate of radio link re-establishment.

17 Claims, 6 Drawing Sheets

METHOD AND APPARATUS FOR RE-ESTABLISHING RADIO LINK

TECHNICAL FIELD

This disclosure relates to the field of communications including, e.g., a method and an apparatus for re-establishing a radio link.

BACKGROUND

When a User Equipment (UE) hands over, after the UE hands over to a destination side E-UTRAN Node B (eNB), the UE needs to adopt a new security algorithm configuration; however, for a scenario of UE handover failure, the UE will initiate a re-establishment request and fall back the security algorithm to an old security algorithm (that is, the security algorithm used by a source side eNB); therefore, as mentioned in the related art, when the UE hands over, the source side eNB needs to transfer the security algorithm thereof to the destination side eNB for being used under a scenario of radio link re-establishment.

However, in the related art, transferring the security algorithm of the source side eNB to the destination side eNB is mentioned only, which is used in the potential scenario of radio link re-establishment, and specific scenarios of radio link re-establishment are not distinguished; however, there are a variety of scenarios of radio link re-establishment; some of the scenarios of radio link re-establishment are not caused by the UE handover failure; and in this scenario, the problem of fallback process failure will occur based on the security algorithm of the UE falling back to the old security algorithm.

For example, in a scenario of non-competition handover, the UE receives an Msg 2 (a randomly accessed second message), at the moment, the UE considers that the handover succeeds; however, due to the quality problem of a radio link, when a re-configuration complete message is sent to the destination side eNB, Radio Link Control (RLC) layer at a user surface of the UE exceeds the maximum times of re-transmission, and at the moment, the UE could also initiate the re-establishment request to the destination side eNB; according to the related art, since the destination side eNB does not receive the re-configuration complete message, the destination side eNB considers that the handover does not succeed, at the moment the security algorithm of the UE will be updated to the old security algorithm based on receiving the re-establishment request; however, at the moment, since the UE considers that the handover succeeds, the security algorithm used by the UE has been a new security algorithm, but because of the failure of sending the re-configuration complete message to the destination side eNB, the UE sends the re-establishment request to the destination side eNB, which is not caused by the UE handover failure in a real sense; therefore, the security algorithm fallback process performed by the destination side eNB is bound to fail.

In the related art, since the security algorithm fallback process is wrongly performed in the process of radio link re-establishment, thereby it results in the problems of radio link re-establishment failure and a low success rate of the radio link re-establishment.

SUMMARY

The disclosure provides a method and an apparatus for re-establishing a radio link, so as to at least solve the problem in the related art that since the security algorithm fallback process is wrongly performed in the process of radio link re-establishment, thereby it results in the failure of the radio link re-establishment and a low success rate of the radio link re-establishment.

According to one aspect of the disclosure, a method for re-establishing a radio link is provided, the method comprises: a destination base station receiving a re-establishment request message sent by a UE, wherein a cell identifier and an identifier of the UE are carried in the re-establishment request message, and attribute information used for indicating UE handover success or handover failure is carried in the cell identifier and the identifier of the UE; and the destination base station determining, according to the attribute information, a security algorithm applied to a radio link re-establishment between the destination base station and the UE, and establishing the radio link by using the security algorithm.

The destination base station determining, according to the attribute information, a security algorithm applied to the radio link re-establishment between the destination base station and the UE and establishing the radio link by using the security algorithm comprise: when the cell identifier is an identifier of a cell corresponding to a source base station, the identifier of the UE is an identifier allocated by the source base station for the UE, and the UE handover fails, the destination base station determines that the security algorithm is a security algorithm of the source base station corresponding to the UE, and establishes the radio link by using the security algorithm of the destination base station.

The destination base station determining, according to the attribute information, a security algorithm applied to the radio link re-establishment between the destination base station and the UE and establishing the radio link by using the security algorithm comprise: when the cell identifier is an identifier of a cell corresponding to the destination base station, and the identifier of the UE is an identifier allocated by the destination base station for the UE, the UE handover succeeds, the destination base station determines that the security algorithm is a security algorithm of the destination base station, and establishes the radio link by using the security algorithm of the source base station.

Before the destination base station receiving a re-establishment request message sent by a user equipment (UE), wherein the cell identifier and the identifier of the UE are carried in the re-establishment request message, and the cell identifier and the identifier of the UE are used for indicating UE handover success or handover failure, the above-mentioned radio link re-establishment method further comprises: when the UE handover succeeds, the destination base station receiving a request which is sent by the UE and used for allocating the cell identifier for the cell corresponding to the destination base station and allocating the identifier for the UE; and the destination base station allocating the cell identifier for the cell corresponding to the destination base station and allocating the identifier for the UE, and sending the cell identifier and the identifier of the UE to the UE.

The cell identifier comprises: a Physical Cell Identifier (PCI), and the identifier of the UE comprises: Cell Radio Network Temporary Identifier (C-RNTI).

According to another aspect of the disclosure, a method for re-establishing a radio link is provided, wherein the method comprises: the UE determining a handover result of the UE; and the UE sending a re-establishment request to the destination base station, wherein the re-establishment request carrying the cell identifier and the identifier of the UE which are used for indicating the handover result, wherein attribute information used for indicating UE handover success or handover failure is carried in the cell identifier and the identifier of the UE, and the cell identifier and the identifier of the UE are used for indicating that the destination base station determines, according to the attribute information, the security algorithm applied to radio link re-establishment between the destination base station and the UE.

The UE sending a re-establishment request carrying the cell identifier and the identifier of the UE which are used for indicating a handover result to the destination base station, wherein attribute information used for indicating UE handover success or handover failure is carried in the cell identifier and the identifier of the UE, and the cell identifier and the identifier of the UE are used for indicating that the destination base station determines, according to the attribute information, the security algorithm applied to the radio link re-establishment between the destination base station and the UE, comprises: when the UE handover succeeds, the UE sending the re-establishment request carrying the cell identifier and the identifier of the UE to the destination base station, wherein the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establishing the radio link by using the security algorithm of the destination base station; and when the UE handover fails, the UE sending the re-establishment request carrying the cell identifier and the identifier of the UE to the destination base station, wherein the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establishing the radio link by using the security algorithm of the source base station.

The cell identifier comprises: the Physical Cell Identifier (PCI), and the identifier of the UE comprises: the Cell Radio Network Temporary Identifier (C-RNTI).

According to another aspect of the disclosure, an apparatus for re-establishing radio link is provided, applied to a base station, wherein the apparatus comprises: a reception element, configured to receive a re-establishment request message sent by a User Equipment (UE), wherein a cell identifier and an identifier of the UE are carried in the re-establishment request message, and attribute information used for indicating UE handover success or handover failure is carried in the cell identifier and the identifier of the UE; and a determination element, configured to determine, according to the attribute information, a security algorithm applied to a radio link re-establishment between the destination base station and the UE, and establish the radio link by using the security algorithm.

The determination element comprises: a first determination component, configured to determine, when the cell identifier is an identifier of a cell corresponding to a source base station, the identifier of the UE is an identifier allocated by the source base station for the UE, and the UE handover fails, that the security algorithm is a security algorithm of the source base station corresponding to the UE, and establish the radio link by using the security algorithm of the destination base station.

The determination element comprises: a second determination component, configured to determine, when the cell identifier is an identifier of a cell corresponding to a destination base station, the identifier of the UE is an identifier allocated by the destination base station for the UE, and the UE handover succeeds, that the security algorithm is a security algorithm of the destination base station, and establish the radio link by using the security algorithm of the source base station.

According to another aspect of the disclosure, an apparatus for re-establishing a radio link is provided, applied to a User Equipment (UE) and comprises: a determination element, configured to determine a handover result of the UE; and a sending element, configured to send a re-establishment request carrying the cell identifier and the identifier of the UE which are used for indicating the handover result to the destination base station, wherein attribute information used for indicating UE handover success or handover failure is carried in the cell identifier and the identifier of the UE, and the cell identifier and the identifier of the UE are used for indicating that the destination base station determines, according to the attribute information, the security algorithm applied to the radio link re-establishment between the destination base station and the UE.

The sending element comprises: a first sending component, configured to send, when the UE handover succeeds, the re-establishment request carrying the cell identifier and the identifier of the UE to the destination base station, wherein the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establishing the radio link by using the security algorithm of the destination base station; and a second sending component, configured to send, when the UE handover fails, the re-establishment request carrying the cell identifier and the identifier of the UE to the destination base station, wherein the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establishing the radio link by using the security algorithm of the source base station.

In the disclosure, in the process of radio link re-establishment, the destination base station receives the re-establishment request message sent by the UE, wherein a cell identifier and an identifier of the UE are carried in the re-establishment request message, and attribute information used for indicating UE handover success or handover failure is carried in the cell identifier and the identifier of the UE; the destination base station can determine, according to the attribute information of the cell identifier, whether the UE handover succeeds, and then can determine the security algorithm applied to radio link re-establishment between the destination base station and the UE and establish a radio link by using the security algorithm. Thereby, it avoids the problem in the related art that the radio link re-establishment fails as a security algorithm fallback process fails and the security algorithm applied to radio link re-establishment cannot be determined; thus the destination base station can accurately determine the security algorithm applied to the radio link re-establishment, and the success rate of radio link re-establishment is improved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF EMBODIMENTS

The disclosure is described below with reference to the accompanying drawings and embodiments in detail. Note that, the embodiments of the present application and the features of the embodiments can be combined with each other if there is no conflict.

Embodiment 1

Figure 1:
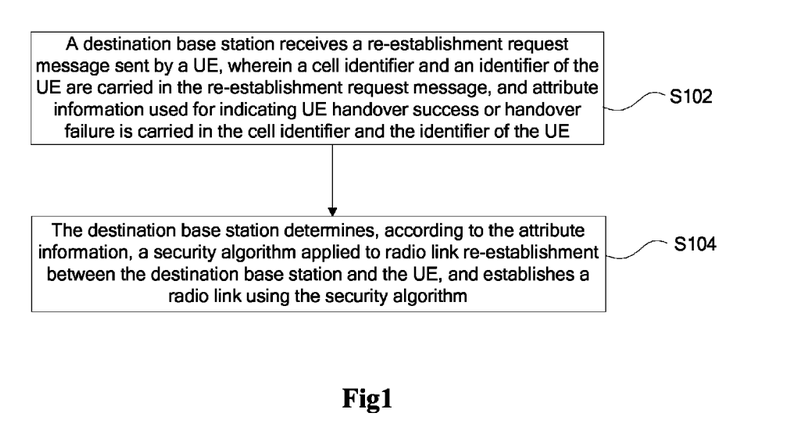
FIG. 1 is a flowchart of a method for re-establishing a radio link according to an embodiment of the disclosure.

This embodiment provides a method for re-establishing a radio link; FIG. 1 is a flowchart of the method for re-establishing a radio link according to the embodiment of the disclosure, and as shown in FIG. 1, the method for re-establishing the radio link comprises steps S102 to S104.

Step S102: a destination base station receives a re-establishment request message sent by a UE, wherein a cell identifier and an identifier of the UE are carried in the re-establishment request message, and attribute information used for indicating UE handover success or handover failure is carried in the cell identifier and the identifier of the UE.

Step S104: the destination base station determines, according to the attribute information, a security algorithm applied to a radio link re-establishment between the destination base station and the UE and establishing the radio link using the security algorithm.

Through the above-mentioned steps, in the process of radio link re-establishment, the destination base station receives the re-establishment request message sent by the UE, wherein the cell identifier and the identifier of the UE are carried in the re-establishment request message, and attribute information used for indicating UE handover success or handover failure is carried in the cell identifier and the identifier of the UE; the destination base station can determine, according to the attribute information of the cell identifier, whether the UE handover succeeds, and then can determine the security algorithm applied to radio link re-establishment between the destination base station and the UE and establish a radio link by using the security algorithm; thereby it avoids the problem in the related art that the radio link re-establishment fails as a security algorithm fallback process fails and the security algorithm applied to radio link re-establishment cannot be determined; thus the destination base station can accurately determine the security algorithm applied to the radio link re-establishment, and the success rate of radio link re-establishment is improved.

In order to accurately determine, according to the attribute information, a security algorithm applied to radio link re-establishment between the destination base station and the UE and establish the radio link by using the security algorithm, in the embodiment of the disclosure, a method for determining, according to the attribute information, security algorithm applied to radio link re-establishment between the destination base station and the UE and establishing the radio link by using the security algorithm is provided. For example, when the cell identifier carried in the received re-establishment request message is an identifier of a cell corresponding to the source base station, and the identifier of the UE is an identifier allocated by the source base station for the UE, that is, UE handover fails, the destination base station determines that the security algorithm is a security algorithm of the source base station corresponding to the UE, and establishes the radio link by using the security algorithm of the destination base station.

In the above-mentioned embodiment, when the cell identifier is an identifier of a cell corresponding to the source base station, and the identifier of the UE is an identifier allocated by the source base station for the UE, that is, when UE handover fails, i.e. security algorithm fallback needs to be performed, the destination base station can determine, according to the attribute of the cell identifier, that UE handover has failed, and security algorithm fallback needs to be performed; thereby it avoids the problem that in a scenario which is not the UE handover failure in a real sense, a security algorithm fallback process fails as the results whether the UE handover succeeds considered by the UE and the destination base station eNB are inconsistent; and then the destination base station can determine that security algorithm applied to radio link re-establishment is the security algorithm of the source base station, and establish the radio link by using the security algorithm of the source base station. Therefore, it improves the accuracy for the destination base station to determine whether the UE handover succeeds, and improves the accuracy to determine, according to the cell identifier and the identifier of the UE, the security algorithm applied to radio link re-establishment between the destination base station and the UE.

At the same time, in order to improve application adaptability and meet application requirements of different scenarios, in this embodiment, another method for determining, according to the attribute information, a security algorithm applied to radio link re-establishment between the destination base station and the UE and establishing a radio link by using the security algorithm is provided. For example, when the cell identifier carried in the received re-establishment request message is an identifier of a cell corresponding to the destination base station, and the identifier of the UE is an identifier allocated by the destination base station for the UE, that is, the UE handover succeeds, the destination base station determines that the security algorithm is a security algorithm of the destination base station, and establishes the radio link by using the security algorithm of the source base station.

In the above-mentioned embodiment, when the attribute information of the cell identifier and the identifier of the UE carried in the received re-establishment request message indicates that the UE handover succeeds, that is, the security algorithm fallback does not need to be performed, even though in the scenarios such as re-configuration complete message sending failure, and the re-establishment request message is sent, the destination base station can still determine, according to the attribute information of the cell identifier and the identifier of the UE, that the UE handover succeeds, and the security algorithm fallback does not need to be performed. Thereby, It avoids the problem that in a scenario which is not the UE handover failure in a real sense (the UE handover succeeds, the radio link establishment fails as other reasons, and the radio link needs to be re-established), a security algorithm fallback process fails as the results whether the UE handover succeeds considered by the UE and the destination base station eNB are inconsistent; and then the destination base station can still determine that security algorithm applied to radio link re-establishment is the security algorithm of the destination base station, and establish the radio link by using the security algorithm of the source base station. Therefore, it avoids the problem in the related art that the security algorithm fallback process initiated by the destination side eNB (base station) fails as the results whether the UE handover succeeds considered by the UE and the destination base station eNB are inconsistent, thus improving the accuracy for the destination base station to determine whether the UE handover succeeds, and improving the accuracy to determine, according to the cell identifier and the identifier of the UE, the security algorithm applied to radio link re-establishment between the destination base station and the UE; meanwhile, application requirements of different scenarios can be met, and the application adaptability of this embodiment is enhanced.

In order to accurately indicate the scenario of UE handover success by using the cell identifier and the identifier of the UE, in this embodiment, the above-mentioned method for re-establishing the radio link further comprises: before the destination base station receives a re-establishment request message sent by a UE, when the UE handover succeeds, the destination base station receives a request which is sent by the UE and used for allocating the cell identifier for the cell corresponding to the destination base station and allocating the identifier for the UE; and the destination base station allocates the cell identifier for the cell corresponding to the destination base station and allocates the identifier for the UE, and sends the cell identifier and the identifier of the UE to the UE.

In the above-mentioned embodiment, when the UE handover succeeds, the destination base station allocates the cell identifier for a cell corresponding to the destination base station and allocates the identifier for the UE, and sends the cell identifier and the identifier of the UE to the UE, so as to enable the UE to carry the allocated cell identifier and the identifier of the UE in a re-establishment request message. Even though in the scenarios such as re-configuration complete message sending failure, and the re-establishment request message is sent, the destination base station can still determine, according to the cell identifier and the identifier of the UE, that the UE handover succeeds, and the security algorithm fallback does not need to be performed; and then determine that security algorithm applied to radio link re-establishment is the security algorithm of the destination base station, and establish the radio link by using the security algorithm of the source base station.

Preferably, the cell identifiers in each of the above-mentioned embodiments may comprise but not limited to: a Physical Cell Identifier (PCI), and the identifier of the UE may comprise but not limited to: Cell Radio Network Temporary Identifier (C-RNTI), for example, when the UE handover succeeds, the destination base station allocates the physical cell identifier for the cell corresponding to the destination base station, and the destination base station allocates the cell radio network temporary identifier for the UE; and when the UE handover fails, the source base station allocates the physical cell identifier for the cell corresponding to the source base station, and the source base station allocates the cell radio network temporary identifier for the UE, and judges, according to the attribute information of the cell identifier and the identifier of the UE, whether the UE handover succeeds, and then determines whether the security algorithm fallback needs to be performed.

Figure 2:
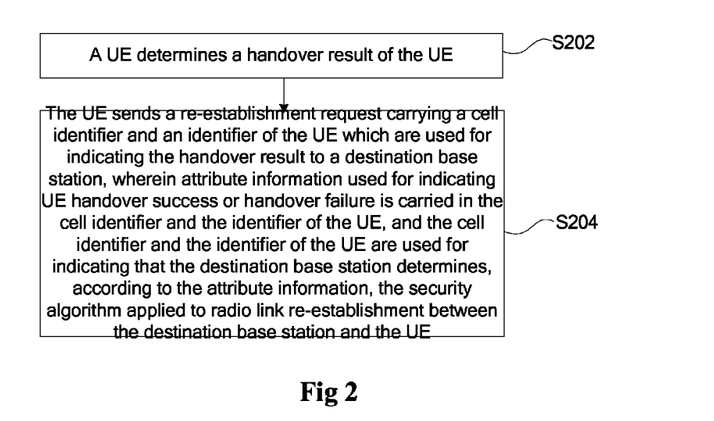
FIG. 2 is a flowchart of another method for re-establishing a radio link according to an embodiment of the disclosure.

This embodiment provides another method for re-establishing a radio link; FIG. 2 is a flowchart of another method for re-establishing a radio link according to the embodiment of the disclosure, and as shown in FIG. 2, the method for re-establishing the radio link comprises steps S202 to S204.

Step S202: a UE determines a handover result of the UE.

Step S204: the UE sends a re-establishment request carrying a cell identifier and an identifier of the UE which are used for indicating the handover result to a destination base station, wherein attribute information used for indicating UE handover success or handover failure is carried in the cell identifier and the identifier of the UE, and the cell identifier and the identifier of the UE are used for indicating that the destination base station determines, according to the attribute information, the security algorithm applied to radio link re-establishment between the destination base station and the UE.

Through the above-mentioned steps, the UE firstly determines whether the UE handover succeeds, and uses the attribute information of the cell identifier and the identifier of the UE to indicate the determined handover result, and when a re-establishment request is sent to the destination base station, the cell identifier and the identifier of the UE are carried in the re-establishment request, so as to indicate the destination base station to determine, according to the cell identifier and the identifier of the UE, whether the UE handover succeeds, thereby avoiding the problem that in a scenario which is not the UE handover failure in a real sense, a security algorithm fallback process fails as the results whether the UE handover succeeds considered by the UE and the destination base station eNB are inconsistent; then determining the security algorithm applied to radio link re-establishment between the destination base station and the UE, and avoiding the problem in the related art that the radio link re-establishment fails as security algorithm fallback process fails and the security algorithm applied to radio link re-establishment cannot be re-established; thus the destination base station can accurately determine the security algorithm applied to the radio link re-establishment, and the success rate of radio link re-establishment is improved.

In order to accurately send a re-establishment request carrying the cell identifier and the identifier of the UE which are used for indicating the handover result to the destination base station; meanwhile, in order to improve the application adaptability of this embodiment, in this embodiment, the step of the UE sending a re-establishment request carrying the cell identifier and the identifier of the UE which are used for indicating a handover result to the destination base station is provided, attribute information used for indicating UE handover success or handover failure is carried in the cell identifier and the identifier of the UE, and the cell identifier and the identifier of the UE are used for indicating that the destination base station determines, according to the attribute information, the security algorithm applied to radio link re-establishment between the destination base station and the UE comprises: for example, when the UE handover succeeds, the UE sends the re-establishment request carrying the cell identifier and the identifier of the UE to the destination base station, the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establish the radio link by using the security algorithm of the destination base station; and when the UE handover fails, the UE sends the re-establishment request carrying the cell identifier and the identifier of the UE to the destination base station, the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establish the radio link by using the security algorithm of the source base station.

In the above-mentioned embodiment, when the UE handover succeeds, that is, the security algorithm fallback does not need to be performed, the cell identifier and the identifier of the UE which comprise information indicating UE handover success are carried in the re-establishment request and sent to the destination base station. Even though in the scenarios such as re-configuration complete message sending failure, and the re-establishment request message is sent, the destination base station can still determine, according to the cell identifier and the identifier of the UE, that the UE handover succeeds, and the security algorithm fallback does not need to be performed; then determine that security algorithm applied to radio link re-establishment is the security algorithm of the destination base station, and establish the radio link by using the security algorithm of the destination base station; and when the UE handover fails, that is, the security algorithm fallback needs to be performed, the destination base station can determine, according to the cell identifier and the identifier of the UE, that UE handover has failed, and the security algorithm fallback needs to be performed, and determine that the security algorithm applied to radio link re-establishment is the security algorithm of the source base station, and establish the radio link using the security algorithm of the source base station, thereby improving the accuracy for the destination base station to determine whether the UE handover succeeds, and improving the accuracy to determine, according to the cell identifier and the identifier of the UE, the security algorithm applied to radio link re-establishment between the destination base station and the UE; meanwhile, application requirements of different scenarios can be met, and the application adaptability of this embodiment is enhanced.

Preferably, the cell identifiers in each of the above-mentioned embodiments may comprise but not limited to: a physical cell identifier (PCI), and the identifier of the UE may comprise but not limited to: a cell radio network temporary identifier (C-RNTI), for example, when the UE handover succeeds, the UE requests the destination base station to allocate the physical cell identifier for the cell corresponding to the destination base station, and the destination base station allocates the cell radio network temporary identifier for the UE; and when the UE handover fails, the UE acquires the physical cell identifier allocated by the source base station for the cell corresponding to the source base station, and the source base station allocates the cell radio network temporary identifier for the UE, and carries the cell identifier and the identifier of the UE in the re-establishment request message and sends to the destination base station, so as to the destination base station can judge, according to the attribute information of the cell identifier and the identifier of the UE, whether the UE handover succeeds, and then determine whether the security algorithm fallback needs to be performed.

The above-mentioned various embodiments will be described in detail below in conjunction with the accompanying drawings and examples.

EXAMPLE 1

Figure 3:
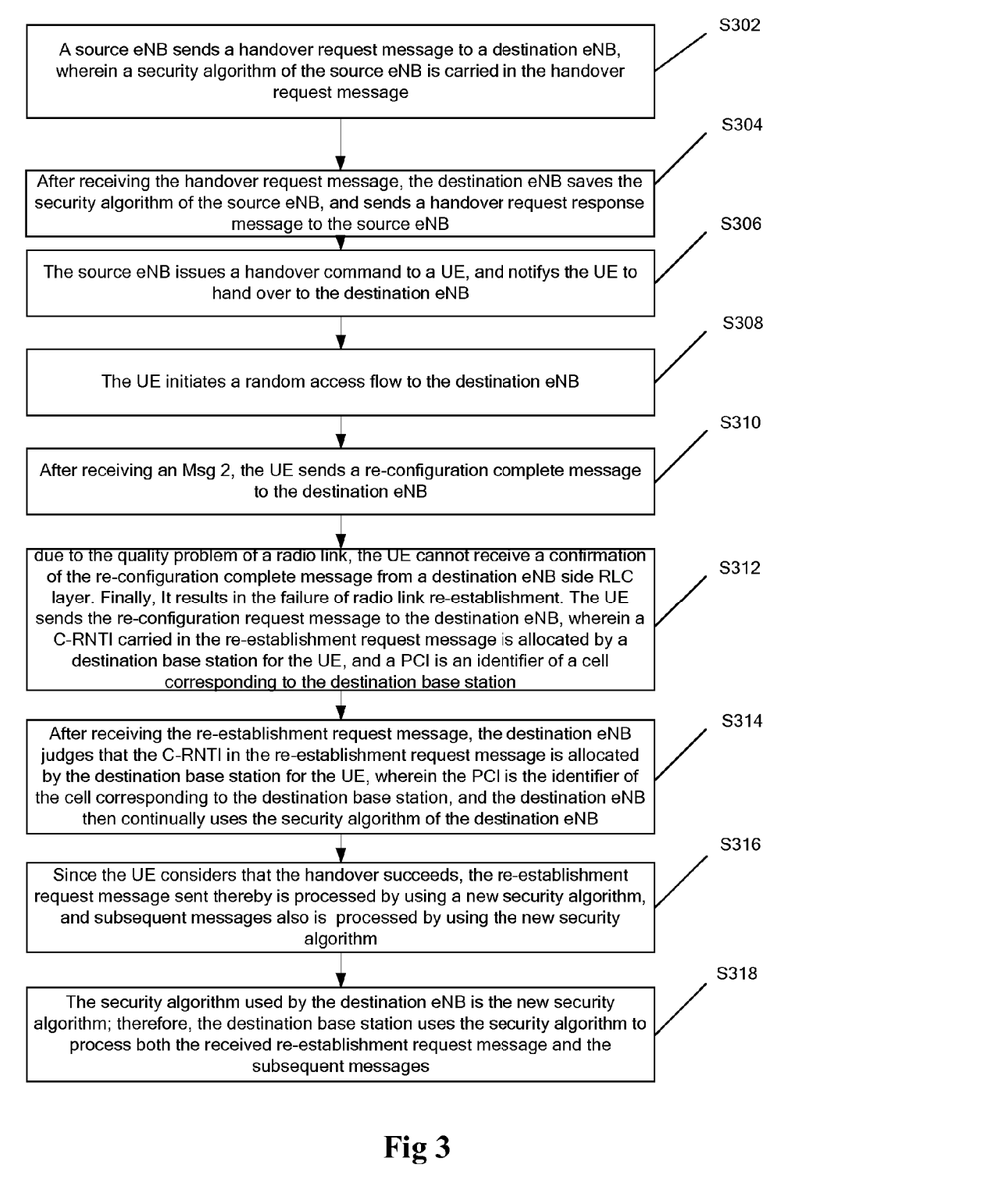
FIG. 3 is a flowchart of the embodiment I of the method for re-establishing a radio link according to an embodiment of the disclosure.

In this example, taking the scenario of re-establishing a radio link when the UE handover succeeds for example; as shown in FIG. 3, the method for re-establishing the radio link comprises steps S302 to S318.

Step S302: a source eNB sends a handover request message to a destination eNB, wherein a security algorithm of the source eNB is carried in the handover request message.

Step S304: after receiving the handover request message, the destination eNB saves the security algorithm of the source eNB, and sends a handover request response message to the source eNB.

Step S306: the source eNB issues a handover command to a UE, and notifies the UE to hand over to the destination eNB.

Step S308: the UE initiates a random access flow to the destination eNB.

Step S310: after receiving an Msg 2 (process message 2), the UE considers that UE handover succeeds, and sends a re-configuration complete message to the destination eNB.

Step S312: due to the quality problem of a radio link, the UE cannot receive a confirmation of the re-configuration complete message from a destination eNB side RLC layer. Finally, It results in the failure of radio link re-establishment. The UE sends the re-configuration request message to the destination eNB, wherein a C-RNTI carried in the re-establishment request message is allocated by a destination base station for the UE, and a PCI is an identifier of a cell corresponding to the destination base station.

Step S314: after receiving the re-establishment request message, the destination eNB judges that the C-RNTI in the re-establishment request message is allocated by the destination base station for the UE, wherein the PCI is the identifier of the cell corresponding to the destination base station, and the destination eNB continually uses the security algorithm of the destination eNB.

Step S316: since the UE considers that the handover succeeds, the re-establishment request message sent thereby is processed by using a new security algorithm, and subsequent messages also is processed by using the new security algorithm.

Step S318: the security algorithm used by the destination eNB is the new security algorithm; therefore, the destination base station uses the security algorithm to process both the received re-establishment request message and the subsequent messages.

In this embodiment, when the UE handover succeeds, that is, the security algorithm fallback does not need to be performed, even though in the scenarios such as re-configuration complete message sending failure, and the re-establishment request message is sent, the destination base station can still determine, according to the cell identifier, that the UE handover succeeds, and the security algorithm fallback does not need to be performed; then determine that security algorithm applied to radio link re-establishment is the security algorithm of the destination base station, and establish the radio link by using the security algorithm of the source base station, thereby avoiding the problem in the related art that the security algorithm fallback process initiated by the destination side eNB (base station) fails as the results whether the UE handover succeeds considered by the UE and the destination base station eNB are inconsistent.

EXAMPLE 2

Figure 4:
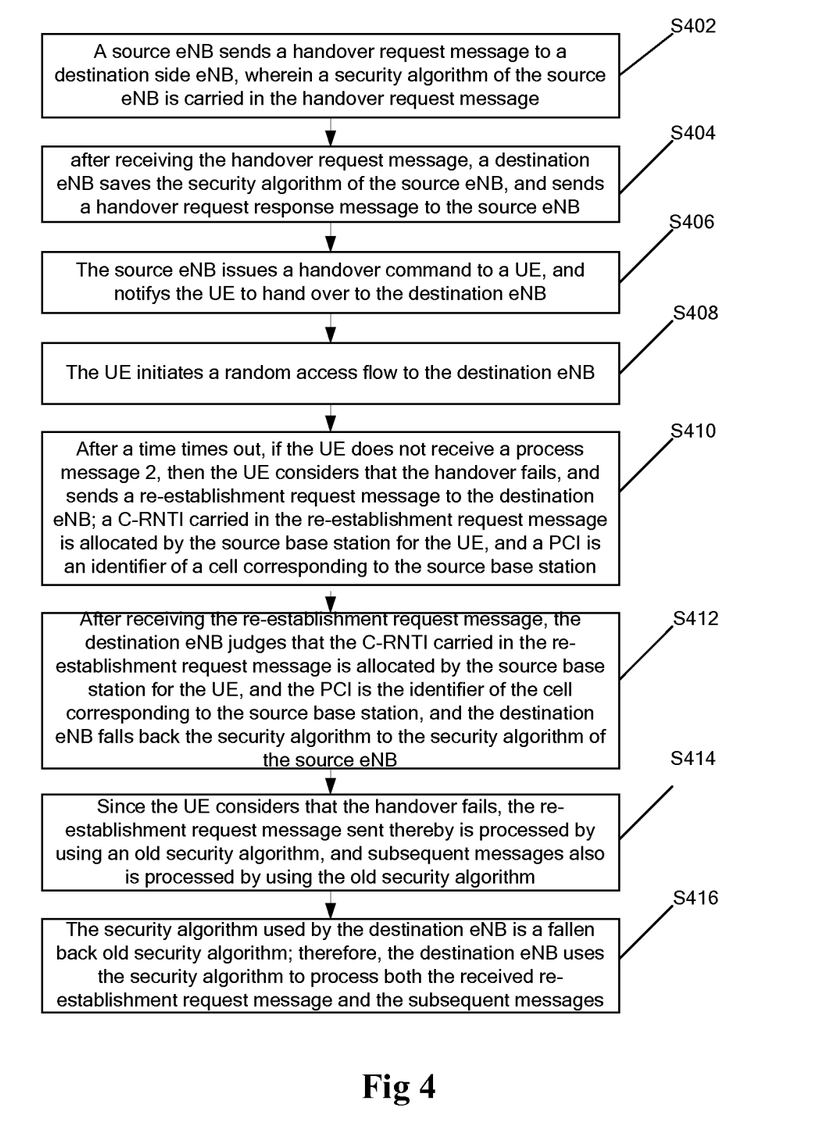
FIG. 4 is a flowchart of the embodiment II of the method for re-establishing a radio link according to an embodiment of the disclosure.

In this example, taking the scenario of re-establishing a radio link when the UE handover fails for example; as shown in FIG. 4, the method for re-establishing the radio link comprises steps S402 to S416.

Step S402: a source eNB sends a handover request message to a destination side eNB, wherein a security algorithm of the source eNB is carried in the handover request message.

Step S404: after receiving the handover request message, a destination eNB saves the security algorithm of the source eNB, and sends a handover request response message to the source eNB.

Step S406: the source eNB issues a handover command to a UE, and notifies the UE to hand over to the destination eNB.

Step S408: the UE initiates a random access flow to the destination eNB.

Step S410: after a timer times out, if the UE does not receive an Msg 2, then the UE considers that the handover fails, and sends a re-establishment request message to the destination eNB; a C-RNTI carried in the re-establishment request message is allocated by the source base station for the UE, and a PCI is an identifier of a cell corresponding to the source base station.

Step S412: after receiving the re-establishment request message, the destination eNB judges that the C-RNTI carried in the re-establishment request message is allocated by the source base station for the UE, and the PCI is the identifier of the cell corresponding to the source base station, and falls back the security algorithm to the security algorithm of the source eNB.

Step S414: since the UE considers that the handover fails, the re-establishment request message sent thereby is processed by using an old security algorithm, and subsequent messages also are processed using the old security algorithm.

Step S416: the security algorithm used by the destination eNB is a fallen back old security algorithm; therefore, the destination eNB uses the old security algorithm to process both the received re-establishment request message and the subsequent messages.

In this example, when the UE handover fails, that is, the security algorithm fallback needs to be performed, the destination base station can determine, according to the cell identifier, that UE handover has failed, and the security algorithm fallback needs to be performed, and then determine that the security algorithm applied to radio link re-establishment is the security algorithm of the source base station, and establish the radio link by using the security algorithm of the source base station.

Embodiment 2

Figure 5:
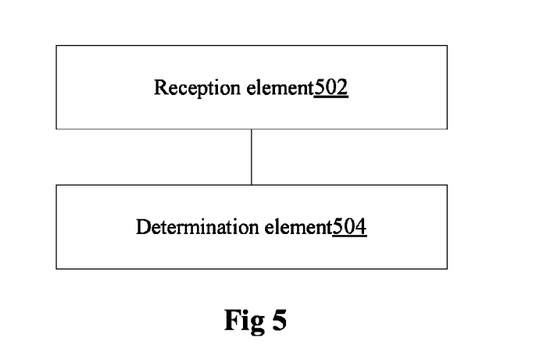
FIG. 5 is a structural diagram of an apparatus for re-establishing a radio link applied to a base station according to an embodiment of the disclosure.

This embodiment provides an apparatus for re-establishing a radio link; FIG. 5 is a structural diagram of an apparatus for re-establishing a radio link applied to a base station according to an embodiment of the disclosure. The apparatus can be applied to a destination base station, and as shown in FIG. 5, the apparatus for re-establishing a radio link comprises: a reception element 502 and a determination element 504, and the structure above is explained below in detail.

The reception element 502, is configured to receive a re-establishment request message sent by a user equipment (UE), wherein a cell identifier and an identifier of the UE are carried in the re-establishment request message, and attribute information used for indicating UE handover success or handover failure is carried in the cell identifier and the identifier of the UE; and the determination element 504 is connected to the reception element 502, is configured to determine, according to the attribute information, a security algorithm applied to a radio link re-establishment between the destination base station and the UE, and establish the radio link by using the security algorithm.

In the above-mentioned embodiment, in the process of radio link re-establishment, the reception element 502 receives the re-establishment request message sent by the UE, wherein a cell identifier and an identifier of the UE are carried in the re-establishment request message, and attribute information used for indicating UE handover success or handover failure is carried in the cell identifier and the identifier of the UE; the determination element 504 can determine, according to the attribute information of the cell identifier and the identifier of the UE, whether the UE handover succeeds, and then can determine the security algorithm applied to radio link re-establishment between the destination base station and the UE and establish a radio link by using the security algorithm, thereby avoiding the problem in the related art that the radio link re-establishment fails as a security algorithm fallback process fails and the security algorithm applied to radio link re-establishment cannot be determined; thus the destination base station can accurately determine the security algorithm applied to the radio link re-establishment, and the success rate of radio link re-establishment is improved.

Figure 6:
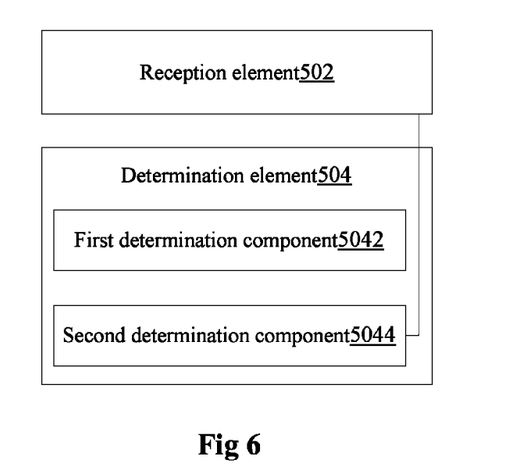
FIG. 6 is a structural diagram of a determination element according to the embodiments of the disclosure.

In order to accurately determine, according to the cell identifier and the identifier of the UE, the security algorithm applied to radio link re-establishment between the destination base station and the UE; meanwhile, in order to meet the application requirements of different scenarios, in this embodiment, as shown in FIG. 6, the above-mentioned determination element 504 comprises: a first determination component 5042 and a second determination component 5044, and the structure above is described below in detail.

The first determination component 5042, is configured to determine, when the cell identifier is an identifier of a cell corresponding to a source base station, and the identifier of the UE is an identifier allocated by the source base station for the UE, the UE handover fails, that the security algorithm is a security algorithm of the source base station corresponding to the UE, and establish the radio link by using the security algorithm of the destination base station. The second determination component 5044, is configured to determine, when the cell identifier is an identifier of a cell corresponding to a destination base station, and the identifier of the UE is an identifier allocated by the destination base station for the UE, the UE handover succeeds, that the security algorithm is a security algorithm of the destination base station, and establish the radio link by using the security algorithm of the source base station.

In the above-mentioned embodiment, when the UE handover succeeds, that is, the security algorithm fallback does not need to be performed, even though in the scenarios such as re-configuration complete message sending failure, when the re-establishment request message is sent, the first determination component 5042 can still determine, according to the cell identifier and the identifier of the UE, that the UE handover succeeds, and the security algorithm fallback does not need to be performed. Therefore, it avoids the problem that in a scenario which is not the UE handover failure in a real sense, a security algorithm fallback process fails as the results whether the UE handover succeeds considered by the UE and the destination base station eNB are inconsistent, and then the destination can determine that security algorithm applied to radio link re-establishment is the security algorithm of the destination base station, and establish the radio link by using the security algorithm of the source base station; and when the UE handover fails, that is, the security algorithm fallback needs to be performed, the second determination component 5044 can determine, according to the cell identifier and the identifier of the UE, that UE handover has failed, and the security algorithm fallback needs to be performed, and determine that the security algorithm applied to radio link re-establishment is the security algorithm of the source base station, and establish the radio link by using the security algorithm of the source base station. Therefore, the accuracy for the destination base station to determine whether the UE handover succeeds is improved, and the accuracy to determine, according to the cell identifier and the identifier of the UE, the security algorithm applied to radio link re-establishment between the destination base station and the UE is also improved; meanwhile, application requirements of different scenarios can be met, and the application adaptability of this embodiment is enhanced.

Figure 7:
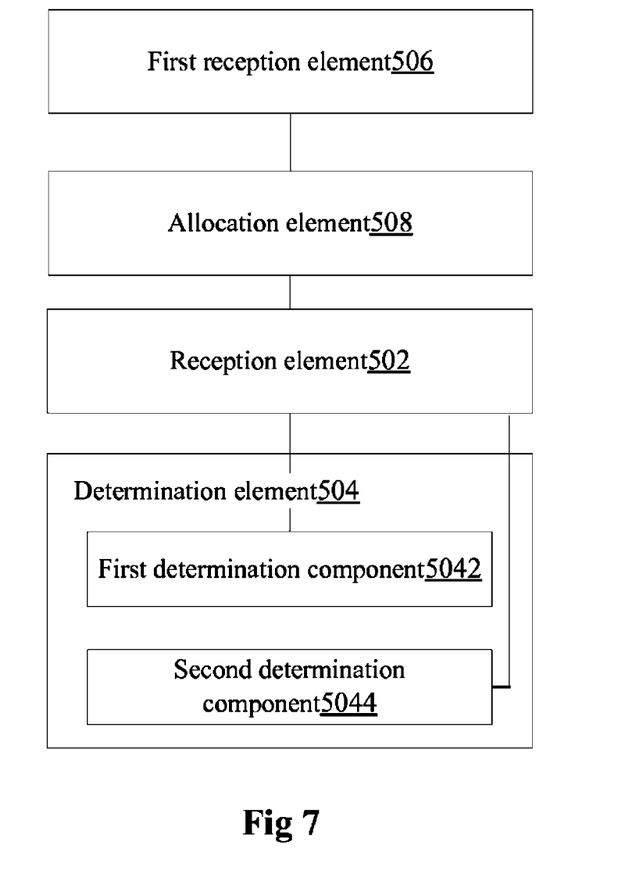
FIG. 7 is a structural diagram of another apparatus for re-establishing a radio link applied to a base station according to an embodiment of the disclosure.

In order to accurately indicate the scenario of UE handover success using the cell identifier and the identifier of the UE, in this embodiment, as shown in FIG. 7, the above-mentioned apparatus for re-establishing the radio link applied to the base station comprises: a first reception element 506 and an allocation element 508, and the structure above is described below in detail.

The first reception element 506, is configured to receive, before the destination base station receives a re-establishment request message sent by a user equipment (UE), and when the UE handover succeeds, a request which is sent by the UE and used for allocating the cell identifier for the cell corresponding to the destination base station and allocating the identifier for the UE; and the allocation element 508 is connected to the first reception element 506, is configured to allocate the cell identifier for the cell corresponding to the destination base station and allocating the identifier for the UE, and send the cell identifier and the identifier of the UE to the UE.

In the above-mentioned embodiment, when the UE handover succeeds, the allocation element 508 allocates the cell identifier for a cell corresponding to the destination base station and allocates the identifier for the UE, and sends the cell identifier and the identifier of the UE to the UE, so as to enable the UE to carry the allocated cell identifier and the identifier of the UE in a re-establishment request message, even though in the scenarios such as re-configuration complete message sending failure, and the re-establishment request message is sent, the destination base station can still determine, according to the cell identifier, that the UE handover succeeds, and the security algorithm fallback does not need to be performed; then determine that security algorithm applied to radio link re-establishment is the security algorithm of the destination base station, and establish the radio link using the security algorithm of the source base station.

Preferably, the cell identifiers in each of the above-mentioned embodiments may comprise but not limited to: a PCI, and the identifier of the UE may comprise but not limited to: a C-RNTI, for example, when the UE handover succeeds, the destination base station allocates the physical cell identifier for the cell corresponding to the destination base station, and the destination base station allocates the cell radio network temporary identifier for the UE; and when the UE handover fails, the source base station allocates the physical cell identifier for the cell corresponding to the source base station, and the source base station allocates the cell radio network temporary identifier for the UE, and judges, according to the attribute information of the cell identifier and the identifier of the UE, whether the UE handover succeeds, and then determines whether the security algorithm fallback needs to be performed.

Figure 8:
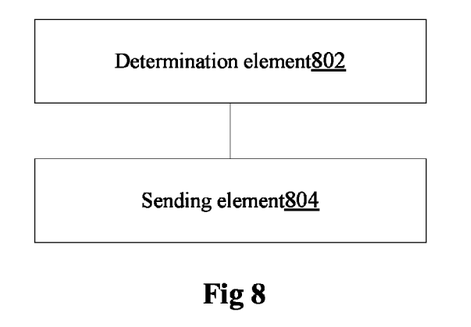
FIG. 8 is a structural diagram of an apparatus for re-establishing a radio link applied to a UE according to an embodiment of the disclosure.

This embodiment provides another apparatus for re-establishing a radio link; FIG. 8 is a structural diagram of an apparatus for re-establishing a radio link applied to a UE according to an embodiment of the disclosure. Preferably, the apparatus is applied to the UE, and as shown in FIG. 8, the apparatus for re-establishing a radio link comprises: a determination element 802 and a sending element 804, and the structure above is described below in detail.

The determination element 802, is configured to determine a handover result of the UE; and the sending element 804 is connected to the determination element 802, is configured to send a re-establishment request carrying the cell identifier and the identifier of the UE which are used for indicating the handover result to the destination base station, attribute information used for indicating UE handover success or handover failure is carried in the cell identifier and the identifier of the UE, and the cell identifier and the identifier of the UE are used for indicating that the destination base station determines, according to the attribute information, the security algorithm applied to the radio link re-establishment between the destination base station and the UE.

In the above-mentioned embodiments, the determination element 802 firstly determines whether the UE handover succeeds, and uses the attribute information of the cell identifier and the identifier of the UE to indicate the determined handover result, and when the sending element 804 sends a re-establishment request to the destination base station, the cell identifier and the identifier of the UE are carried in the re-establishment request, so as to indicate the destination base station to determine, according to the cell identifier and the identifier of the UE, whether the UE handover succeeds, thereby avoiding the problem that in a scenario which is not the UE handover failure in a real sense, a security algorithm fallback process fails as the results whether the UE handover succeeds considered by the UE and the destination base station eNB are inconsistent, then determining the security algorithm applied to radio link re-establishment between the destination base station and the UE, and avoiding the problem in the related art that the radio link re-establishment fails as security algorithm fallback process fails and the security algorithm applied to radio link re-establishment cannot be determined; thus the destination base station can accurately determine the security algorithm applied to the radio link re-establishment, and the success rate of radio link re-establishment is improved.

Figure 9:
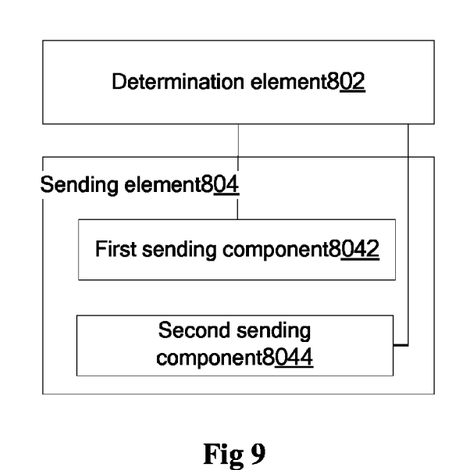
FIG. 9 is a structural diagram of a sending element according to an embodiment of the disclosure.

In order to accurately send a re-establishment request carrying the cell identifier and the identifier of the UE which are used for indicating the handover result to the destination base station; meanwhile, in order to improve the application adaptability of this embodiment, in this embodiment, as shown in FIG. 9, the above-mentioned sending element 804 comprises: a first sending component 8042 and a second sending component 8044, and the structure above is described below in detail.

The first sending component 8042, is configured to send, when the UE handover succeeds, the re-establishment request carrying the cell identifier and the identifier of the UE to the destination base station, wherein the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establish the radio link by using the security algorithm of the destination base station; and the second sending component 8044, is configured to send, when the UE handover fails, the re-establishment request carrying the cell identifier and the identifier of the UE to the destination base station, the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establish the radio link by using the security algorithm of the source base station.

In the above-mentioned embodiment, when the UE handover succeeds, that is, the security algorithm fallback does not need to be performed, the first sending component 8042 carries the cell identifier and the identifier of the UE which comprise information indicating UE handover success in the re-establishment request and sends to the destination base station. Even though in the scenarios such as re-configuration complete message sending failure, and the re-establishment request message is sent, the destination base station can still determine, according to the cell identifier and the identifier of the UE, that the UE handover succeeds, and the security algorithm fallback does not need to be performed; then determine that security algorithm applied to radio link re-establishment is the security algorithm of the destination base station, and establish the radio link by using the security algorithm of the source base station; and when the UE handover fails, that is, the security algorithm fallback needs to be performed, the second sending component 8044 carries the cell identifier and the identifier of the UE which comprise information indicating UE handover failure in the re-establishment request and sends to the destination base station, so as to enable the destination base station to determine, according to the cell identifier and the identifier of the UE, that UE handover has failed, and the security algorithm fallback needs to be performed, and determine that the security algorithm applied to radio link re-establishment is the security algorithm of the source base station, and establish the radio link by using the security algorithm of the source base station, thereby improving the accuracy for the destination base station to determine whether the UE handover succeeds, and improving the accuracy to determine, according to the cell identifier and the identifier of the UE, the security algorithm applied to radio link re-establishment between the destination base station and the UE; meanwhile, application requirements of different scenarios can be met, and the application adaptability of this preferred embodiment is enhanced.

Preferably, the cell identifiers in each of the above-mentioned embodiments may comprise but not limited to: a PCI, and the identifier of the UE may comprise but not limited to: a C-RNTI, for example, when the UE handover succeeds, the UE requests the destination base station to allocate the physical cell identifier for the cell corresponding to the destination base station, and the destination base station allocates the cell radio network temporary identifier for the UE; and when the UE handover fails, the UE acquires the physical cell identifier allocated by the source base station for the cell corresponding to the source base station, and the source base station allocates the cell radio network temporary identifier for the UE, and carries the cell identifier and the identifier of the UE in the re-establishment request message and sends to the destination base station, so as to enable the destination base station to judge, according to the attribute information of the cell identifier and the identifier of the UE, whether the UE handover succeeds, and then determines whether the security algorithm fallback needs to be performed.

Obviously, those skilled in the art should know that each of the above-mentioned elements or steps of the disclosure can be implemented by universal computing apparatuses; the elements or steps can be focused on a single computing apparatus, or distributed on the network formed by a plurality of computing apparatuses; optionally, they can be implemented by the program codes which can be executed by the computing apparatuses; thereby, the elements or steps can be stored in a memory apparatus and executed by the computing apparatuses; and under some circumstances, the shown or described steps can be executed in different orders, or can be independently manufactured as each integrated circuit element, or a plurality of elements or steps thereof can be manufactured to be single integrated circuit element, thus to be implemented. In this way, the disclosure is not restricted to any particular hardware and software combination.

The descriptions above are only the preferable embodiment of the disclosure, which are not used to restrict the disclosure, for a person skilled in the art, the disclosure may have various changes and variations. Any amendments, equivalent substitutions, improvements, etc. within the spirit and principle of the disclosure are all included in the scope of the protection of the disclosure.

The invention claimed is:

1. A method for re-establishing radio link, comprising:
    a destination base station receiving a re-establishment request message sent by a User Equipment (UE), wherein a cell identifier and an identifier of the UE are carried in the re-establishment request message, and attribute information used for indicating UE handover success or handover failure is carried in the cell identifier and the identifier of the UE; and
    the destination base station determining, according to the attribute information, a security algorithm applied to a radio link re-establishment between the destination base station and the UE, and establishing the radio link by using the security algorithm.

2. The method according to claim 1, wherein the destination base station determining, according to the attribute information, a security algorithm applied to the radio link re-establishment between the destination base station and the UE and establishing the radio link by using the security algorithm comprises:
    when the cell identifier is an identifier of a cell corresponding to a source base station, and the identifier of the UE is an identifier allocated by the source base station for the UE, the UE handover fails, and the destination base station determines that the security algorithm is a security algorithm of the source base station corresponding to the UE, and establishes the radio link by using the security algorithm of the destination base station.

3. The method according to claim 1, wherein the destination base station determining, according to the attribute information, a security algorithm applied to the radio link re-establishment between the destination base station and the UE and establishing the radio link by using the security algorithm comprises:
    when the cell identifier is an identifier of a cell corresponding to a destination base station, and the identifier of the UE is an identifier allocated by the destination base station for the UE, the UE handover succeeds, and the destination base station determines that the security algorithm is a security algorithm of the destination base station, and establishes the radio link using the security algorithm of the source base station.

4. The method according to claim 1, wherein before the destination base station receiving the re-establishment request message sent by the UE, wherein the cell identifier and the identifier of the UE are carried in the re-establishment request message, and attribute information used for indicating UE handover success or handover failure is carried in the cell identifier and the identifier of the UE, the method further comprises:
  when the UE handover succeeds, the destination base station receiving a request which is sent by the UE and used for allocating the cell identifier for the cell corresponding to the destination base station and allocating the identifier for the UE; and
  the destination base station allocating the cell identifier for the cell corresponding to the destination base station and allocating the identifier for the UE, and sending the cell identifier and the identifier of the UE to the UE.

5. The method according to claim 1, wherein the cell identifier comprises: a Physical Cell Identifier (PCI), and the identifier of the UE comprises: a Cell Radio Network Temporary Identifier (C-RNTI).

6. The method according to claim 2, wherein the cell identifier comprises: a PCI, and the identifier of the UE comprises: a C-RNTI.

7. The method according to claim 3, wherein the cell identifier comprises: a PCI, and the identifier of the UE comprises: a C-RNTI.

8. The method according to claim 4, wherein the cell identifier comprises: a PCI, and the identifier of the UE comprises: a C-RNTI.

9. A method for re-establishing radio link, comprising:
  a User Equipment (UE) determining a handover result of the UE;
  the UE sending a re-establishment request carrying a cell identifier and an identifier of the UE which are used for indicating the handover result to a destination base station, wherein attribute information used for indicating the UE handover success or handover failure is carried in the cell identifier and the identifier of the UE, and the cell identifier and the identifier of the UE are used for indicating that the destination base station determines, according to the attribute information, a security algorithm applied to radio link re-establishment between the destination base station and the UE.

10. The method according to claim 9, wherein the UE sending a re-establishment request carrying a cell identifier and an identifier of the UE which are used for indicating the handover result to a destination base station, wherein attribute information used for indicating the UE handover success or handover failure is carried in the cell identifier and the identifier of the UE, and the cell identifier and the identifier of the UE are used for indicating that the destination base station determines, according to the attribute information, a security algorithm applied to the radio link re-establishment between the destination base station and the UE, comprises:
  when the UE handover succeeds, the UE sending the re-establishment request carrying the cell identifier and the identifier of the UE to the destination base station, wherein the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establishing the radio link by using the security algorithm of the destination base station; and
  when the UE handover fails, the UE sending the re-establishment request carrying the cell identifier and the identifier of the UE to the destination base station, wherein the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establishing the radio link by using the security algorithm of the source base station.

11. The method according to claim 9, wherein the cell identifier comprises: a Physical Cell Identifier (PCI), and the identifier of the UE comprises: a Cell Radio Network Temporary Identifier (C-RNTI).

12. The method according to claim 10, wherein the cell identifier comprises: a PCI, and the identifier of the UE comprises: a C-RNTI.

13. An apparatus for re-establishing radio link, applied to a base station, comprising:
  a reception element, configured to receive a re-establishment request message sent by a User Equipment (UE), wherein a cell identifier and an identifier of the UE are carried in the re-establishment request message, and attribute information used for indicating UE handover success or handover failure is carried in the cell identifier and the identifier of the UE; and
  a determination element, configured to determine, according to the attribute information, a security algorithm applied to a radio link re-establishment between a destination base station and the UE, and establish the radio link using the security algorithm.

14. The apparatus according to claim 13, wherein the determination element comprises:
  a first determination component, configured to determine, when the cell identifier is an identifier of a cell corresponding to a source base station, and the identifier of the UE is an identifier allocated by the source base station for the UE, the UE handover fails, that the security algorithm is a security algorithm of the source base station corresponding to the UE, and establish the radio link by using the security algorithm of the destination base station.

15. The apparatus according to claim 13, wherein the determination element comprises:
  a second determination component, configured to determine, when the cell identifier is an identifier of a cell corresponding to a destination base station, and the identifier of the UE is an identifier allocated by the destination base station for the UE, the UE handover succeeds, that the security algorithm is a security algorithm of the destination base station, and establish the radio link by using the security algorithm of the source base station.

16. An apparatus for re-establishing radio link, applied to a User Equipment (UE), comprising:
  a determination element, configured to determine a handover result of the UE; and
  a sending element, configured to send a re-establishment request carrying a cell identifier and an identifier of the UE which are used for indicating the handover result to a destination base station, wherein attribute information used for indicating the UE handover success or handover failure is carried in the cell identifier and the identifier of the UE, and the cell identifier and the identifier of the UE are used for indicating that the destination base station determines, according to the attribute information, a security algorithm applied to the radio link re-establishment between the destination base station and the UE.

17. The apparatus according to claim 16, wherein the sending element comprises:
- a first sending component, configured to send, when the UE handover succeeds, the re-establishment request carrying the cell identifier and the identifier of the UE to the destination base station, wherein the cell identifier is an identifier of a cell corresponding to the destination base station, and the identifier of the UE is an identifier allocated by the destination base station for the UE, the cell identifier and the identifier of the UE are used for indicating the destination base station to determine that the security algorithm is a security algorithm of the destination base station, and establish the radio link by using the security algorithm of the destination base station; and
- a second sending component, configured to send, when the UE handover fails, the re-establishment request carrying the cell identifier and the identifier of the UE to the destination base station, wherein the cell identifier is an identifier of a cell corresponding to the source base station, and the identifier of the UE is an identifier allocated by the source base station for the UE, the cell identifier and the identifier of the UE are used for indicating the destination base station to determine that the security algorithm is a security algorithm of the source base station corresponding to the UE, and establish the radio link by using the security algorithm of the source base station.

* * * * *